US006632515B1

(12) United States Patent
Matsuura

(10) Patent No.: US 6,632,515 B1
(45) **Date of Patent: *Oct. 14, 2003**

(54) HEAT-SENSITIVE STENCIL SHEET

(75) Inventor: Masahiro Matsuura, Tokyo (JP)

(73) Assignee: Riso Kagaku Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,202

(22) Filed: Aug. 30, 1999

(30) Foreign Application Priority Data

Sep. 1, 1998 (JP) .......................................... 10-246813

(51) Int. Cl.[7] ............................ B32B 27/14; B32B 3/00

(52) U.S. Cl. ................. 428/220; 428/297.4; 428/304.4; 428/365; 428/401; 428/913

(58) Field of Search ................................ 428/195, 217, 428/220, 297.4, 304.4, 365, 401, 913

(56) References Cited

U.S. PATENT DOCUMENTS 5,690,527 A * 11/1997 Rutledge et al. .............. 442/76
5,740,734 A 4/1998 Mori et al.
5,855,169 A * 1/1999 Mori et al. ................. 101/116

FOREIGN PATENT DOCUMENTS

EP 806303 11/1997

* cited by examiner

*Primary Examiner*—Bruce H. Hess
*Assistant Examiner*—B. Shewareged
(74) *Attorney, Agent, or Firm*—Fay, Sharpe, Fagan, Minnich & McKee, LLP

(57) ABSTRACT

The present invention provides a heat-sensitive stencil sheet providing excellent printing images by preventing deterioration of susceptibility to perforation by a thermal head even when the sheet is wound up into a roll or is stacked with another sheet for a long period of time, and comprising a thermoplastic resin film of constant smoothness laminated onto a porous support, the surface of the porous support having a PPS surface smoothness of 1.2 μm or less, at the side opposite to that facing the thermoplastic resin film, as measured while a separate film having a PPS surface smoothness of 0.0 μm and a thickness of 0.1–10 μm is pressed against the surface of the porous support.

4 Claims, No Drawings

HEAT-SENSITIVE STENCIL SHEET

BACKGROUND OF THE INVENTION

1. Field of the Invention

The present invention relates to a heat-sensitive stencil sheet, and more particularly, to a heat-sensitive stencil sheet comprising a thermoplastic resin film of constant surface smoothness laminated on a porous support even when the sheet is wound up into a roll or a plurality of sheets are stacked for a long period of time, and which provides excellent printing images.

2. Background Art

A heat-sensitive stencil sheet is produced, for example, by laminating a thermoplastic resin film having a thickness of approximately 2 μm, directly or via an adhesive, to an ink-permeable porous support such as Washi (Japanese paper), and applying a releasing agent to the surface of the film to prevent sticking.

In order to make a stencil master, a thermal printing head (TPH) is typically employed. In this case, if the surface of the stencil sheet is rough, uniform contact cannot be attained between the TPH and a film laminated on a porous support, resulting in some parts being easily perforated and other parts being difficult to perforate. Accordingly, the resultant perforations do not necessarily reflect the original text or drawing faithfully, and satisfactorily printing images cannot be obtained.

To avoid this shortcoming, attempts have been made to secure surface smoothness of a stencil sheet by use of a porous support having excellent surface smoothness. Particularly, in recent years, stencil sheet rolls, i.e., stencil sheets wound up into a roll around a core such as a paper tube, are often employed so as to enhance operation efficiency of stencil printing. In this case, even though the stencil sheet has excellent surface smoothness when assuming the form of a flat sheet, winding pressure applied to the sheet during winding to form a roll deteriorates surface smoothness with the passage of time, to thereby fail to obtain excellent printing images.

In order to solve the above problem, Japanese Patent Application Laid-Open (kokai) No. 6-239048 discloses a method for preventing deterioration of the surface smoothness of a stencil sheet by adjusting the winding density of a roll. However, even though winding density is controlled, pressure is applied to a stencil sheet when the sheet is pulled from the roll set in a stencil printing apparatus, to thereby cause "tight winding" of the stencil sheet roll, with the result that surface smoothness of the stencil sheet cannot be maintained, particularly in the vicinity of the core of the roll. If winding pressure is reduced so as to avoid this drawback, another problem is caused in that handling of the roll becomes poor due to phenomena such as "core separation", "dishing," and "telescoping."

As has been conventionally performed, when a porous support is directly subjected to measurement of surface smoothness by use of an air-leak tester such as an Ohken smoothness tester or a PPS (Parker Print Surf) smoothness tester, the smoothness cannot be measured correctly, due to leakage of air through the pores, and measured smoothness values disadvantageously vary widely. In addition, a laser surface profile tester cannot measure surface smoothness correctly, since the measured values are affected by the thickness of the porous support.

Japanese Patent Application Laid-Open (kokai) No. 8-67081 discloses that surface roughness of a thermoplastic resin film laminated onto a porous support is measured by use of surface roughness tester (Model SE-3E, product of Kosaka Seisakusho, stylus surface roughness tester) in accordance with JIS B-06101. The publication has proposed a method for improving performance in perforation of a stencil sheet by use of a thermal head, through the selection of a porous support having a surface roughness of 10 μm or less based on the above measurement. However, since the surface smoothness of the porous support of a stencil sheet is not specified, deterioration of surface smoothness cannot be prevented if the stencil sheet is wound up into a roll or stored in a stacked state for a long period of time. In addition, according to this prior art method, measurement of surface smoothness is performed after production of a stencil sheet by heat-pressing a porous support and a film. Therefore, surface smoothness of the produced sheet product cannot be estimated before production of the stencil sheet.

SUMMARY OF THE INVENTION

In view of the foregoing, the present inventors have conducted earnest studies on the mechanism of deterioration of surface smoothness of stencil sheets stored in a rolled state or in a stacked state for a long time, and have found that the above-mentioned problems can be removed by correctly measuring, without large variation, surface smoothness of the porous support of a heat-sensitive stencil sheet and by specifying and determining the surface roughness. The present invention was achieved based on this finding.

Accordingly, an object of the present invention is to provide a heat-sensitive stencil sheet which comprises a thermoplastic resin film of constant surface smoothness laminated on a porous support even when the sheet is wound up into a roll or a plurality of sheets are stacked for a long period of time, and which provides excellent printing images by preventing deterioration of characteristics related to perforation by a thermal head.

Accordingly, in a first aspect of the present invention, there is provided a heat-sensitive stencil sheet comprising a thermoplastic resin film laminated onto a porous support, in which the PPS surface smoothness of the surface of the porous support of the stencil sheet is 1.2 μm or less as measured while a film having PPS surface smoothness of 0.0 μm and a thickness of 0.1–10 μm is pressed against the surface of the porous support.

Preferably, in the first aspect of the invention, the PPS surface smoothness of another surface of the porous support to be laminated with a thermoplastic resin film is 0.9 μm or less as measured while a film having a PPS surface smoothness of 0.0 μm and a thickness of 0.1–10 μm is pressed against the other surface of the porous support.

Preferably, the porous support has an average fiber diameter of 2–20 μm.

In stencil sheet rolls and stencil sheets in a stacked state, the film surface of the stencil sheets adheres to a surface of a porous support of other stencil sheets due to tension during winding or pressure during storage or transportation. The adhesion causes transfer of the rough profile of the surface of the porous support to the film surface of the contacting stencil sheet. For example, an unsupported part of the film on a porous support is dented due to pressure from stacked stencil sheets as time passes, to thereby deteriorate surface smoothness of the film. Therefore, time-elapsed deterioration of surface smoothness of the film surface of a stencil sheet can be prevented by providing a porous support having a smooth surface which maintains contact with other film surface of a stencil sheet.

In the present invention, PPS surface smoothness of the surface of a porous support that maintains contact with the film surface of a stencil sheet is measured while a film having a PPS surface smoothness of 0.0 μm and a thickness of 0.1–10 μm is pressed against the surface of the porous support. Therefore, air leakage in the thickness direction of the porous support is eliminated, to thereby enable correct measurement of surface smoothness of the surface of the porous support of a stencil sheet without large variation. Furthermore, the above measurement enables selection of a porous support having a PPS surface smoothness of 1.2 μm or less, so as to surely and effectively prevent time-elapsed deterioration of surface smoothness of the film surface of stencil sheets.

DETAILED DESCRIPTION OF PREFERRED EMBODIMENTS

In the present invention, a PPS surface smoothness of the porous support surface of a heat-sensitive stencil sheet is measured while a film having a PPS surface smoothness of 0.0 μm and a thickness of 0.1–10 μm, preferably 0.1–5.0 μm, more preferably 0.1–3.0 μm, is pressed against the surface of the porous support. The thus-measured surface smoothness is 1.2 μm or less, preferably 1.0 μm or less, more preferably 0.8 μm or less.

When the film for measurement does not have a PPS surface smoothness of 0.0 μm and the thickness of the film falls out of the range of 0.1–10 μm, the surface profile of a porous support is not reproduced correctly, to fail to measure surface smoothness of the porous support correctly.

In practice, a thermoplastic resin film which is actually applied to a stencil sheet is preferably used as the film which is pressed against a support during measurement. The term "PPS surface smoothness" refers to surface smoothness measured by an air-leak method used a Parker Print Surf smoothness tester (product of Messmer Buchel Co.).

When the PPS surface smoothness of the porous support surface of a heat-sensitive stencil sheet is in excess of 1.2 μm, there cannot be prevented time-elapsed deterioration of surface smoothness of the film surface of a stencil sheet that maintains contact with a porous support when the stencil sheet is in a stacked state or wound into a roll.

In addition, the PPS surface smoothness of the surface of another porous support to be laminated with a thermoplastic resin film is 0.9 μm or less, preferably 0.6 μm or less as measured while a similar film for measurement as described above is pressed against the other surface of the porous support. When the PPS surface smoothness is in excess of 0.9 μm, a heat-sensitive stencil sheet made by lamination of the porous support and a thermoplastic resin film is likely to have poor surface smoothness of the film surface.

The porous support preferably has an average fiber diameter of 2–20 μm, more preferably 3–15 μm. An average fiber diameter in excess of 20 μm may result in a PPS surface smoothness of greater than 1.2 μm as measured while a film is pressed against a porous support, whereas an average fiber diameter of less than 2 μm may result in failure to maintain fiber density of the porous support such that ink-permeability is not impeded.

The heat-sensitive stencil sheet is prepared by lamination of a thermoplastic resin film and a porous support.

No particular limitation is imposed on the resin of the thermoplastic resin films used in the present invention. Examples of the resins include polyester, polyamide, polypropylene, polyethylene, poly(vinyl chloride), poly (vinylidene chloride), and other known polymers. Although such films having a small thickness are advantageous in view of perforation sensitivity, production of thin films becomes more expensive. Therefore, the material of the film is preferably selected in accordance with characteristics of the material during thermal perforation by use of a thermal head, such as film thickness, melting point, heat shrinkage (percentage), and shrinkage stress. Of these, stretched polyester films are particularly preferred in view of perforation sensitivity.

Examples of polyesters formed into a polyester film include polyethylene terephthalate, ethylene glycol-terephthalic acid-isophthalic acid copolymers, poly(ethylene 2,6-naphthalate), poly(hexamethylene terephthalate), and hexamethylene glycol-1,4-cyclohexanedimethylene glycol-terephthalic acid copolymers.

The above thermoplastic resin films typically have a thickness of 0.1–10 μm, preferably 0.1–5.0 μm, more preferably 0.1–3.0 μm. When the thickness is in excess of 10 μm, suitability for perforation may be deteriorated, whereas when the thickness is less than 0.1 μm, stability of the formed films may be deteriorated.

A variety of additives may be incorporated into the thermoplastic resin films in accordance with needs. Examples of the additives include flame-retardant agents; heat stabilizers; anti-oxidants; UV-absorbers; anti-static agents; pigments; dyes; organic lubricants such as fatty acid esters and waxes; and anti-foaming agents such as polysiloxane.

No particular limitation is imposed on the porous supports used in the present invention so long as they are porous materials which cannot be perforated substantially during heat from a thermal head and can permeate ink during a printing process. For example, porous supports such as tissue papers, machine made papers, non-woven fabrics, fabrics, and screen cloths may be employed. The tissue papers or machine made papers may be made of natural fibers such as Manila hemp, paper mulberry, Mitsumata (Edgeworthia papyrifera) pulp; or synthetic fibers such as polyester fibers, vinylon, nylon fibers, and rayon. These fibers may be used singly or in combination of two or more species.

The area ratio of pores at a surface of a porous support (pore ratio) obtained by observation of a surface plane of the support is preferably 5–80%, more preferably 5–50%, particularly preferably 5–30%. When the pore ratio is less than 5%, permeability of ink is poor, and images are incompletely printed to thereby lower clearness of the images. When the pore ratio is in excess of 80%, permeability of ink increases to provide a bleeding image, and strike-through occurs easily. The term "pore ratio" refers to the percentage of the area of pores in relation to a specific surface area of a support, as obtained by observation of a surface plane of the support.

No particular limitation is imposed on the method of lamination of a thermoplastic resin film and a porous support, and any method is acceptable so long as the method causes no delamination in a routine operational state and no impediment to perforation of the film and permeation of ink. Typically, an adhesive is employed in lamination, while a thermoplastic resin film may be melt-bonded to a support made of synthetic fiber.

Examples of ingredients of the adhesive include vinyl acetate, acrylic compounds, vinyl chloride-vinyl acetate copolymers, polyesters, and urethanes. Combinations of polyester acrylates, urethane acrylates, epoxy acrylates, or polyol acrylates and a photopolymerizati on initiator may also be employed as a UV-curable adhesive.

In this case, an adhesive predominantly containing urethane acrylate is particularly preferred. The adhesives may further contain other additives, such as antistatic agents and lubricants, in accordance with needs.

In order to prevent sticking to a thermal head and other objects, the heat-sensitive stencil sheet of the present invention preferably has, on the thermoplastic resin film, an anti-sticking layer containing a releasing agent. Known parting agents such as silicone oil, silicone resins, fluororesins, and surfactants may be used. In addition, additives such as antistatic agents, heat-resisting agents, antioxidants, organic particles, inorganic particles, and pigments may be incorporated into an anti-sticking layer in an amount within the range in which the effect of a releasing agent is not impeded. Furthermore, to a coating material of the anti-sticking layer, additives such as dispersing aids, surfactants, antiseptic agents, and defoaming agents may be added in order to enhance water-dispersibility of the above-described additives. The anti-sticking layer typically has a thickness of 0.005–0.4 μm, preferably 0.01–0.4 μm, in view of a running property of a thermal head during perforation and prevention of staining of the head. When the parting agent and other additives are used, they are preferably dissolved in water or emulsified or suspended, in view of environmental safety during an application step and effects on the human body.

EXAMPLES

The present invention will next be described in detail by way of examples, which should not be construed as limiting the invention thereto. Properties of stencil sheets of the following examples were measured and evaluated as described below.

(1) PPS Surface Smoothness

PPS surface smoothness of stencil sheet samples was measured by use of Parker Print-Surf Roughness Tester ME-90 (product of Messmer Buchel Co.) at a clamping pressure of 500 KPa while a film was pressed against a support by use of soft packing. For each sample, PPS surface smoothness was measured at five arbitrary positions, and the average measured value was regarded to represent the PPS surface smoothness of the sample. A thermoplastic resin film used to form a stencil sheet was also used as the above film for measurement. The film has a PPS surface smoothness of 0.0 μm.

(2) Unevenness of Printed Image

After stencil sheets were prepared in Examples and Comparative Examples described below, ten sheets of stencil sheets obtained in each example were stacked. The stacked sheets were pressed from the upper side at a planar pressure of 0.5 kg/cm$^2$ for a period of one day, one week, or one month. After storage of the appropriate duration, a fine character having a dimension of 2 mm×2 mm, a fine line formed of 1-dot and 2-dots, and a black solid having a dimension of 50 mm×50 mm were perforated on a stencil sheet and printed on a paper by use of a stencil printing apparatus (Risograph GR377, registered trademark, product of Riso Kagaku Corporation). The printed images were visually observed and evaluated as follows.

A: No unevenness in the thickness of characters and fine lines and no white dots in the black solid were observed.

B: Evaluation between A and C. Fair level in practical use.

C: Unevenness in the thickness of characters and fine lines and a number of white dots in the black solid were observed.

(3) Reproduction of Gradation

Stencil sheets were stored in a manner similar to that of (2), and images having gradation were printed through modulation of dot density by use of the same stencil printing apparatus. The printed images were visually observed and evaluated as follows.

A: Satisfactory dot reproduction.

B: Evaluation between A and C. Fair level in practical use.

C: Considerable dot failure.

Example 1

A tissue paper sheet formed of a mixture of Manila hemp (60%) and polyester fiber (40%) and having a basis weight of 11.5 g/m$^2$ and a fiber diameter of 8–15 μm was provided as a porous support. One surface of the tissue paper sheet had a PPS surface smoothness of 0.96 μm and the other surface had a PPS surface smoothness of 0.74 μm, as measured while a film was pressed against the corresponding surface. A polyester film having a thickness of 2 μm was bonded to the surface of the porous support having a PPS surface smoothness of 0.74 μm via a poly(vinyl acetate) resin in a coating amount of 0.8 g/m$^2$ as reduced to the solid component. Subsequently, a silicone parting agent was applied to the surface of the polyester film in an amount of 0.1 g/m$^2$, to thereby obtain a heat-sensitive stencil sheet.

Example 2

A polyester non-woven fabric sheet prepared through melt-blow spinning and having a basis weight of 12.3 g/m$^2$ and a fiber diameter of 2–4 μm was provided as a porous support. One surface of the sheet had a PPS surface smoothness of 0.54 μm and the other surface had a PPS surface smoothness of 0.51 μm, as measured while a film was pressed against the corresponding surface. A polyester film having a thickness of 2 μm was melt-bonded to the surface of the porous support having a PPS surface smoothness of 0.51 μm. Subsequently, a silicone parting agent was applied to the surface of the polyester film in an amount of 0.1 g/m$^2$, to thereby obtain a heat-sensitive stencil sheet.

Example 3

The procedure of Example 1 was performed, except that a polyester film was bonded to the surface of the porous support having a PPS surface smoothness of 0.96 μm, to thereby obtain a heat-sensitive stencil sheet.

Comparative Example 1

A tissue paper sheet made of Manila hemp (100%) and having a basis weight of 9.0 g/m$^2$ and a fiber diameter of 10–18 μm was provided as a porous support. One surface of the tissue paper sheet had a PPS surface smoothness of 1.38 μm and the other surface had a PPS surface smoothness of 0.97 μm, as measured while a film was pressed against the corresponding surface. A polyester film having a thickness of 2 μm was bonded to the surface of the porous support having a PPS surface smoothness of 0.97 μm via a poly (vinyl acetate) resin in a coating amount of 0.8 g/m$^2$ as reduced to the solid component. Subsequently, a silicone parting agent was applied to the surface of the polyester film in an amount of 0.1 g/m$^2$, to thereby obtain a heat-sensitive stencil sheet.

Comparative Example 2

A polyester non-woven fabric sheet prepared through melt-blow spinning and having a basis weight of 12.3 g/m$^2$ and a fiber diameter of 20–25 μm was provided as a porous support. One surface of the sheet had a PPS surface smoothness of 1.56 μm and the other surface had PPS surface smoothness of 0.95 μm, as measured while a film was pressed against the corresponding surface. A polyester film having a thickness of 2 μm was melt-bonded to the surface of the porous support having a PPS surface smoothness of 0.95 μm. Subsequently, a silicone parting agent was applied to the surface of the polyester film in an amount of 0.1 g/m$^2$, to thereby obtain a heat-sensitive stencil sheet.

Comparative Example 3

A tissue paper sheet formed of a mixture of Manila hemp (60%) and polyester fiber (40%) and having a basis weight of 12.6 g/m$^2$ and a fiber diameter of 8–15 μm was provided as a porous support. One surface of the tissue paper sheet had a PPS surface smoothness of 1.22 μm and the other surface had a PPS surface smoothness of 0.78 μm, as measured while a film was pressed against the corresponding surface. A polyester film having a thickness of 1.5 μm was bonded to the surface of the porous support having a PPS surface smoothness of 0.78 μm via a poly(vinyl acetate) resin in a coating amount of 0.8 g/m$^2$ as reduced to the solid component. Subsequently, a silicone parting agent was applied to the surface of the polyester film in an amount of 0.1 g/m$^2$, to thereby obtain a heat-sensitive stencil sheet.

Properties of heat-sensitive stencil sheets produced in Examples 1 through 3 and Comparative Examples 1 through 3 were investigated, and the results are shown in Table 1.

TABLE 1

| | PPS surface smoothness | Unevenness of printed image Storage after | | | Reproduction of gradation Storage after | | |
|---|---|---|---|---|---|---|---|
| | of porous support * | 1 day | 1 week | 1 month | 1 day | 1 week | 1 month |
| Ex. 1 | 0.96/0.74 | A | A | A | A | A | A |
| Ex. 2 | 0.54/0.51 | A | A | A | A | A | A |
| Ex. 3 | 0.74/0.96 | B | B | B | B | B | B |
| Comp. Ex. 1 | 1.38/0.97 | B | C | C | A | B | C |
| Comp. Ex. 2 | 1.56/0.95 | B | C | C | B | C | C |
| Comp. Ex. 3 | 1.22/0.78 | B | B | C | A | B | B |

*: "PPS" surface smoothness (μm) of the surface of the porous support of a stencil sheet "/" PPS surface smoothness (μm) of the other surface of the porous support to be laminated with a film"

As is clear from Table 1, stencil sheets obtained in Examples 1 and 2 exhibit no deterioration in surface smoothness and provide an excellent printing image even if stacked with another sheet for a long period of time, since the surfaces of the porous support of the stencil sheets have a PPS surface smoothness of 1.2 μm or less. Similarly, the surfaces of the porous support of stencil sheets obtained in Example 3 have a PPS surface smoothness of 1.2 μm or less. However, surface smoothness of the porous support which maintains contact with a thermoplastic resin film surface is more than 0.9 μm, and perforation susceptibility to a thermal head is slightly deteriorated, to a degree acceptable for practical use.

In contrast, stencil sheets obtained in Comparative Examples 1 through 3 exhibit unevenness of printed images and poor reproduction of gradation, due to their surfaces of the porous support of the stencil sheets having a PPS surface smoothness of more than 1.2 μm.

The heat-sensitive stencil sheet of the present invention comprises a thermoplastic resin film of constant smoothness laminated on a porous support even when the sheet is wound up into a roll or is stacked with another sheet for a long period of time, and provides excellent printing images by preventing deterioration of susceptibility to perforation by a thermal head.

What is claimed is:

1. A heat-sensitive stencil sheet roll, formed by winding up a heat-sensitive stencil sheet to form a roll, the roll comprising a thermoplastic resin film laminated onto a porous support, the surface of the porous support having a PPS surface smoothness of 1.2 μm or less at the side opposite to that facing the thermoplastic resin film, as measured while a separate film having a PPS surface smoothness of 0.0 μm and a thickness of 0.1–10 μm is pressed against the surface of the porous support at the side opposite to that facing the thermoplastic resin film.

2. The heat-sensitive stencil sheet roll according to claim 1 wherein the surface of the porous support has a PPS surface smoothness of 0.9 μm or less, at the side facing the thermoplastic resin film, as measured while a separate film having a PPS surface smoothness of 0.0 μm and a thickness of 0.1–10 μm is pressed against the surface of the porous support at the side facing the thermoplastic resin film.

3. The heat-sensitive stencil sheet roll according to claim 1 wherein the fibers in the porous support have an average fiber diameter of 2–20 μm.

4. The heat-sensitive stencil sheet roll according to claim 2 wherein the fibers in the porous support have an average fiber diameter of 2–20 μm.

* * * * *